3,103,456
DIFLUORAMINE-ETHER PROPELLANT

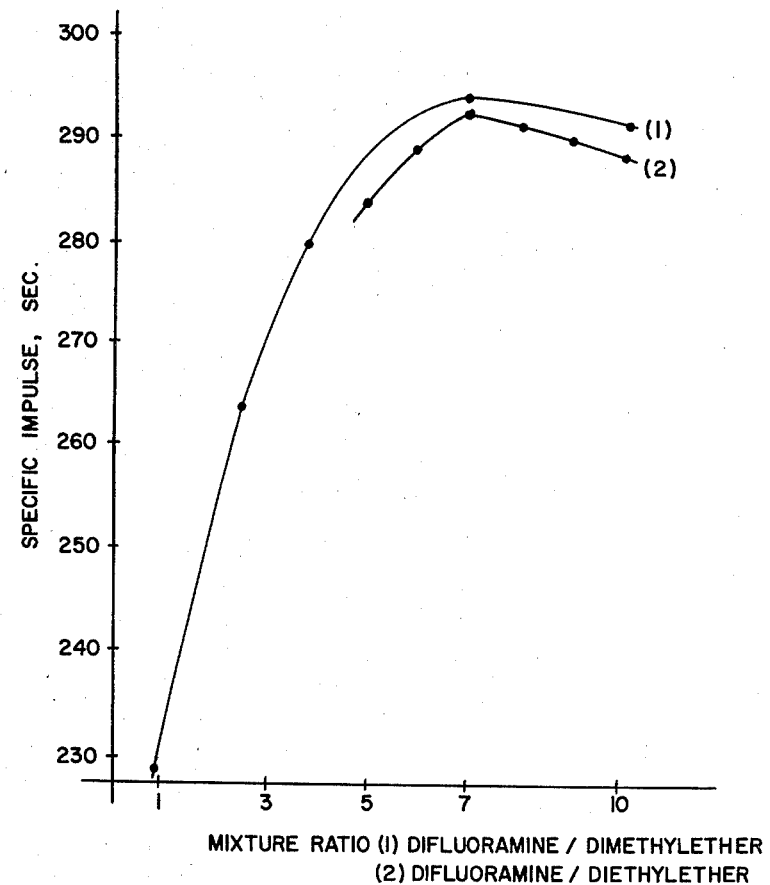
FIG. I

Emil A. Lawton, Woodland Hills, and John Q. Weber, Topanga, Calif., assignors to North American Aviation, Inc.
Filed Sept. 15, 1959, Ser. No. 840,191
7 Claims. (Cl. 149—1)

This invention is directed to a new composition of mattter useful as a rocket propellant. More particularly this invention concerns solutions of difluoramine ($HNF_2$) and oxygenated organic materials namely aliphatic and cyclic ethers.

A continuing desire of those working in the rocket propellant field is to obtain propellants, preferably monopropellants, with specific impulses of over 250 secs. at 300 p.s.i.a. The term "specific impulse" is defined as the impulse delivered by a rocket propulsion system in any time interval divided by the mass of the propellant consumed in the same time interval. Propellants of this invention have typical specific impulses of 294 seconds at 1000 p.s.i.a. and 256 seconds at 300 p.s.i.a. In use the new propellants of the present invention are injected into a reaction or combustion chamber typically of a rocket engine and the gaseous products thereof expanded and expelled typically through the rocket nozzle to provide useful thrust. The propellant may be ignitable by a conventional ignitor in the combustion chamber of the engine or gas generator.

An object of this invention is to provide a new composition of matter.

A further object of this invention is to provide a novel rocket propellant.

A still further object of this invention is to provide a novel rocket monopropellant.

An additional object of this invention is to provide a novel mixture of difluoramine and ethers such as dimethyl ether and diethyl ether.

The above objects as well as other objects of this invention can be seen in the accompanying drawing in which:

FIG. 1 shows a graph of mixture ratios versus specific impulse for difluoramine-dimethyl ether and difluoramine-diethylether.

Basically, the present invention is directed to miscible mixtures of difluoramine and various ethers and adducts thereof. The adduct of dimethyl ether and difluoramine (1:1 mol ratio) is believed by us to have a structure corresponding to $$H_3C-O-CH_3$$
$$|$$
$$HNF_2$$

The difluoramine is coordinately combined with the oxygen atom which is interposed between two carbon atoms. Difluoramine can be obtained from electrolyzing ammonium fluoride and bifluoride to form $NF_3$. The $NF_3$ is then passed over hot copper, carbon, or arsenic to form $CuF+N_2F_4$ with 30–40% yields which $N_2F_4$ is reduced by a reducing agent such as thiophenol to $HNF_2$. Further information on this process may be obtained from an article in the Journal of American Chemical Society, vol. 80, p. 5004 (1958). Alternately, difluoramine may be prepared by the fluorination of various nitrogen compounds such as urea and subsequent fractional condensation as more clearly set out in U.S. patent application Serial No. 840,066, filed September 15, 1959, in the name of the present applicants and entitled "Method of Preparing Difluoramine and Preparing Tetrafluorohydrazine Therefrom."

The particular ethers usable are capable of functioning as a Lewis base, i.e. willing to donate an extra pair of electrons. Examples of specific ethers usable in the present invention include dimethyl ether, methylethyl ether, diethyl ether, diisopropyl ether, methylal, dimethoxyethane, dibutyl ether, anisole, tetrahydrofuran, tetrahydropyran and ethylene oxide.

The aliphatic ethers of the present invention may be defined as ethers of the formula R—O—R' where R and R' are hydrocarbon radicals containing 1 to 6 carbon atoms.

FIG. 1 shows a graph of mixture ratios of difluoramine oxidizer-ether fuel on the weight basis versus specific impulses in seconds at various mixture ratios. Curve (1) for difluoramine-dimethylether shows a specific impulse of 229 for the 1:1 adduct and a specific impulse range of approximately 282–293 in the 4:1 to 8:1 ratio range. Curve (2) for difluoramine-diethylether shows a specific impulse range of approximately 283–292 in the 5:1 to 8:1 ratio range.

The following examples serve to illustrate the mixtures of difluoramine and ethers which make up the present invention.

EXAMPLES

| | Pounds |
|---|---|
| Difluoramine | 6.9 |
| Dimethyl ether | 1.0 |
| Difluoramine | 7.0 |
| Diethyl ether | 1.0 |
| Difluoramine | 4.5 |
| Ethylene oxide | 1.0 |
| Difluoramine | 5.8 |
| Methylal | 1.0 |
| Difluoramine | 5.2 |
| Dimethoxyethane | 1.0 |
| Difluoramine | 1.0 |
| Dimethyl ether | 2.0 |
| Difluoramine | 10.0 |
| Dimethyl ether | 1.0 |
| Difluoramine | 1.0 |
| Diethyl ether | 2.0 |
| Difluoramine | 10.0 |
| Diethyl ether | 1.0 |
| Difluoramine | 1.0 |
| Ethylene oxide | 2.0 |
| Difluoramine | 10.0 |
| Ethylene oxide | 1.0 |

A slightly exothermic reaction occurs upon mixing. Mixing is normally done at a temperature of from room temperature +20° C. to about —140° C. The constituents are mixed at a slow enough rate to dissipate the heat of reaction. The difluoramine and ether are mixed as gases or liquids. The difluoramine may be added to the ether or vice versa. The proportions of difluoramine to ether in the mixtures of the present invention are in the range of from 0.5:1 to 10:1 by weight. The preferred range in which most satisfactory results are obtainable, i.e., the highest specific impulses, is when the ratio of difluoramine to any of the particular ethers is from 4:1 to 8:1. Maximum specific impulse of the difluoramine-dimethyl ether occurs at a ratio of 6.9 by weight of the ether present. Maximum specific impulse of the difluoramine-diethyl ether occurs at a ratio of 7.0 by weight of the ether present. Maximum specific impulse of the difluoramine-ethylene oxide occurs at a ratio of 4.5 by weight of the ether present. Maximum specific impulse of the difluoramine-methylal occurs at a ratio of 5.8, all of the above at 1000 p.s.i.a. The properties of a 1:1 adduct of difluoramine and dimethyl ether are given in the following table:

*Table I*

Boiling point (extrap.) _____ 0° C.

Vapor pressure eq. _____ $\log_{10} p_{mm.} = \frac{-1674}{T} + 9.005$

Heat of vaporation _____ 7.66 kcal./mol.

Trouton's constant _____ 28.1

These physical properties approximate those of difluoramine alone, however, the boiling point of the mixture at which maximum specific impulse occurs, is approximately 9° F. higher than that of difluoramine. Experimentation with dimethyl ether and difluoramine shows them to be compatible from room temperature down to −142° C. Synthetic mixtures ranging from 3 to 80 mol percent difluoramine have been condensed repeatedly at −142° C. without incident. This mixture is of intrinsic interest from the point of view of chemical theory as it exhibits a strong negative deviation from Raoult's law. However, this deviation alone makes the mixture storable as a liquid and suitable for monopropellant systems.

The vapor pressure of the 1:1 dimethyl ether-difluoramine adduct was determined from −80° C. to −34° C. The data are well represented by the following equation:

$$\log 10\ p.m.m. = \frac{1670}{T} + 9.005$$

Thus the extrapolated boiling point is 0° C. (32° F.). The ΔH vap. is 7.66 kcal./mol. employing a ΔH diss. of about 2000 cal./mol. The vapor pressure at 20° C. (68° F.) is 2.6 atmospheres (38 p.s.i.a.). Although somewhat volatile (the compound is usable as a monopropellant.

The 1:1 adduct of difluoramine and ethylene oxide is stable in the vapor phase at room temperature and in the liquid phase at −85° F. Its vapor pressure is close to that of the difluoramine-diethyl ether.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A composition of matter consisting essentially of difluoramine and dimethyl ether in approximately equal proportions.

2. A composition of matter consisting essentially of difluoramine and diethyl ether in approximately equal proportions.

3. A composition of matter consisting essentially of difluoramine and from 5% to 67% by weight of an aliphatic ether of the formula R—O—R' where R and R' are saturated hydrocarbon radicals containing 1 to 6 carbon atoms.

4. A composition of matter consisting essentially of difluoramine and an ether of the formula R—O—R', wherein R and R' are hydrocarbon radicals having from 1 to 6 carbon atoms and with the difluoramine being coordinately combined with the oxygen atom of the ether, and wherein the ratio by weight of difluoramine-to-said ether is from about 0.5:1 to about 10:1.

5. A composition of matter consisting essentially of difluoramine and dimethyl ether in amounts such that the ratio by weight of difluoramine-to-dimethyl ether is from about 0.5:1 to about 10:1.

6. A composition of matter consisting essentially of difluoramine and diethyl ether in amounts such that the ratio by weight of difluoramine-to-diethyl ether is from about 0.5:1 to about 10:1.

7. A composition of matter consisting essentially of difluoramine and ethylene oxide in amounts such that the ratio by weight of difluoramine-to-ethylene oxide is from about 0.5:1 to about 10:1.

No references cited.